(12) United States Patent
De Cremoux et al.

(10) Patent No.: US 8,970,192 B2
(45) Date of Patent: Mar. 3, 2015

(54) BUCK CONVERTER WITH COMPARATOR OUTPUT SIGNAL MODIFICATION CIRCUIT

(75) Inventors: Guillaume De Cremoux, Edinburgh (GB); Gavin Galloway, Stepps (GB); Sergei Slavnov, Loanhead (GB)

(73) Assignee: Analog Devices, Inc., Norwood, MA (US)

( * ) Notice: Subject to any disclaimer, the term of this patent is extended or adjusted under 35 U.S.C. 154(b) by 277 days.

(21) Appl. No.: 13/444,308

(22) Filed: Apr. 11, 2012

(65) Prior Publication Data

US 2013/0093405 A1 Apr. 18, 2013

Related U.S. Application Data

(63) Continuation-in-part of application No. 13/112,499, filed on May 20, 2011, now Pat. No. 8,664,923.

(51) Int. Cl.
| | |
|---|---|
| *G05F 1/00* | (2006.01) |
| *H02M 3/156* | (2006.01) |
| *H02M 1/14* | (2006.01) |
| *G05F 1/10* | (2006.01) |
| *H02M 1/00* | (2006.01) |

(52) U.S. Cl.
CPC ................ *H02M 1/14* (2013.01); *H02M 3/156* (2013.01); *H02M 2001/0025* (2013.01); *G05F 1/10* (2013.01)
USPC .......................................... 323/282; 323/259

(58) Field of Classification Search
USPC ......................................... 323/259, 222, 282
See application file for complete search history.

(56) References Cited

U.S. PATENT DOCUMENTS

| | | | |
|---|---|---|---|
| 6,583,610 B2 | 6/2003 | Groom et al. | |
| 7,436,158 B2* | 10/2008 | Huang et al. | 323/224 |
| 7,457,140 B2 | 11/2008 | Klein | |
| 7,583,146 B2 | 9/2009 | Tam et al. | |
| 7,615,973 B2* | 11/2009 | Uehara | 323/224 |
| 7,714,547 B2* | 5/2010 | Fogg et al. | 323/224 |
| 7,902,805 B2 | 3/2011 | Gibson et al. | |
| 8,253,407 B2 | 8/2012 | Chen et al. | |
| 8,664,923 B2 | 3/2014 | De Cremoux et al. | |
| 2007/0252567 A1* | 11/2007 | Dearn et al. | 323/282 |
| 2010/0019749 A1* | 1/2010 | Katsuya et al. | 323/282 |
| 2010/0027301 A1* | 2/2010 | Hoyerby | 363/39 |
| 2010/0102789 A1* | 4/2010 | Randall | 323/282 |
| 2010/0164770 A1 | 7/2010 | Wan et al. | |
| 2010/0301827 A1* | 12/2010 | Chen et al. | 323/299 |
| 2012/0249093 A1* | 10/2012 | Grbo et al. | 323/234 |
| 2012/0293145 A1 | 11/2012 | De Cremoux et al. | |

OTHER PUBLICATIONS

U.S. Appl. No. 13/112,499, Response filed Jul. 25, 2013 to Non Final Office Action mailed Apr. 25, 2013, 18 pgs.

(Continued)

*Primary Examiner* — Emily P Pham
(74) *Attorney, Agent, or Firm* — Schwegman Lundberg & Woessner, P.A.

(57) ABSTRACT

A buck converter comprising a controller arranged to monitor an output voltage of the converter, the controller comprising: a comparator arranged to compare an output voltage at an output of the buck converter with a reference voltage, and a modification circuit within the comparator or connected to a modification signal input of the comparator and arranged to produce a correction signal to modify the operation of the comparator; and an output.

22 Claims, 10 Drawing Sheets

(56) References Cited

OTHER PUBLICATIONS

U.S. Appl. No. 13/112,499, Examiner Interview Summary mailed Aug. 2, 2013, 3 pgs.

U.S. Appl. No. 13/112,499, Non Final Office Action mailed Apr. 25, 2013, 14 pgs.

U.S. Appl. No. 13/112,499, Notice of Allowance mailed Oct. 24, 2013, 11 pgs.

* cited by examiner

BUCK CONVERTER WITH COMPARATOR OUTPUT SIGNAL MODIFICATION CIRCUIT

RELATED APPLICATIONS

This application is a Continuation-in-Part of U.S. utility application Ser. No. 13/112,499, filed May 20, 2011, now U.S. Pat. No. 8,664,923, the contents of which are herein incorporated by reference in their entirety.

FIELD OF THE INVENTION

The present invention relates to a buck converter.

BACKGROUND OF THE INVENTION

Inductor based buck converters are known to be an efficient way of bucking (reducing) an input voltage from a power supply to a lower output voltage for use by a load. Such converters can exhibit unwanted ripple voltage.

SUMMARY OF THE INVENTION

According to a first aspect of the present invention there is provided a buck converter comprising a controller arranged to monitor an output voltage of the converter, the controller comprising:

a comparator arranged to compare a feedback signal representative of an output voltage at an output of the buck converter with a reference voltage, and a modification circuit within the comparator or connected to a modification signal input of the comparator and arranged to produce a correction signal to modify the operation of the comparator;

and an output.

It is thus possible to provide a buck converter exhibiting improved stability.

The modification signal input, if provided, is distinct from the inverting and non-inverting inputs of a comparator, and is "downstream" of those inputs in signal processing terms. In an embodiment of the invention, the inverting and non-inverting inputs of the comparator are connected to input terminals of respective transistors in a differential pair, and the modification signal input is connected to one of the collector or drain terminals of one or both of the transistors making up the differential pair. However, the modification signal input may be added at a node nearer an output of the controller. The modification signal may be a differential signal applied via first and second modification input nodes.

The modification circuit may receive at least one of an input voltage to the inductor of the buck converter, a synthesized signal representing the voltage at an input of the inductor, and a signal to set a level of hysteresis for the comparator.

Advantageously the comparator controls the operation of a switching arrangement of the buck converter.

An embodiment of the invention comprises:

an inductor;

a first electrically controlled switch for selectively connecting a first terminal of the inductor to a first voltage;

a second electrically controlled switch for selectively connecting the first terminal of the inductor to a second voltage;

a storage element connected to a second terminal of the inductor; and a controller arranged to monitor an output voltage at an output of the converter, the controller comprising a comparator arranged to compare the feedback voltage representing the output voltage with a reference voltage; and a modification circuit within the comparator or connected to a modification signal input of the comparator and arranged to produce a correction signal to modify the operation of the controller.

Preferably the comparator has hysteresis. Such a comparator will be referred to as a "hysteresis comparator" although it is noted that such a device may also be known as a "hysteretic comparator". Hysteresis can be induced internally within the comparator, as is known to the person skilled in the art. Alternatively it can be applied to a non-hysteresis comparator so as to synthesise a comparator having hysteresis. This can be done by modifying the signal at one of the inputs to the comparator as a function of the output of the comparator.

Advantageously further means or circuits are provided within the controller to modify the amount of hysteresis exhibited by the comparator. This enables the switching frequency of the buck converter to be modified, although there is a trade off with its voltage ripple performance. The further means may comprise one or more controllable current flow devices, such as FETs or current sources/sinks, arranged to pull current from or push current to an internal node or nodes within the comparator. The internal node(s) is advantageously an output node of a differential pair within the comparator. The differential pair may be driven from the comparator input stage or may be the comparator input stage.

In another embodiment a hysteresis control signal may be provided by a hysteresis control signal generator. The hysteresis control signal may be summed with an input to or an output of the modification circuit.

According to a second aspect of the present invention there is provided a voltage converter having a comparator, and further comprising a frequency controller arranged to monitor a switching frequency of the voltage converter, and to vary an amount of hysteresis within the comparator or to vary a hysteresis control signal so as to control the switching rate.

According to a third aspect of the present invention there is provided a method of stabilising a buck converter having a comparator within it's control loop, the method comprising monitoring a switch signal to a switching arrangement of the buck converter, and generating a modification signal that modifies the operation of the comparator that, in use, is adapted to compare a feedback signal derived from the output voltage of the buck converter with a reference voltage and to generate the switch signal.

BRIEF DESCRIPTION OF THE FIGURES

The present invention will now be described, by way of example only, with reference to the accompanying Figures, in which.

DESCRIPTION OF SOME EMBODIMENTS OF THE INVENTION

Figure 6:
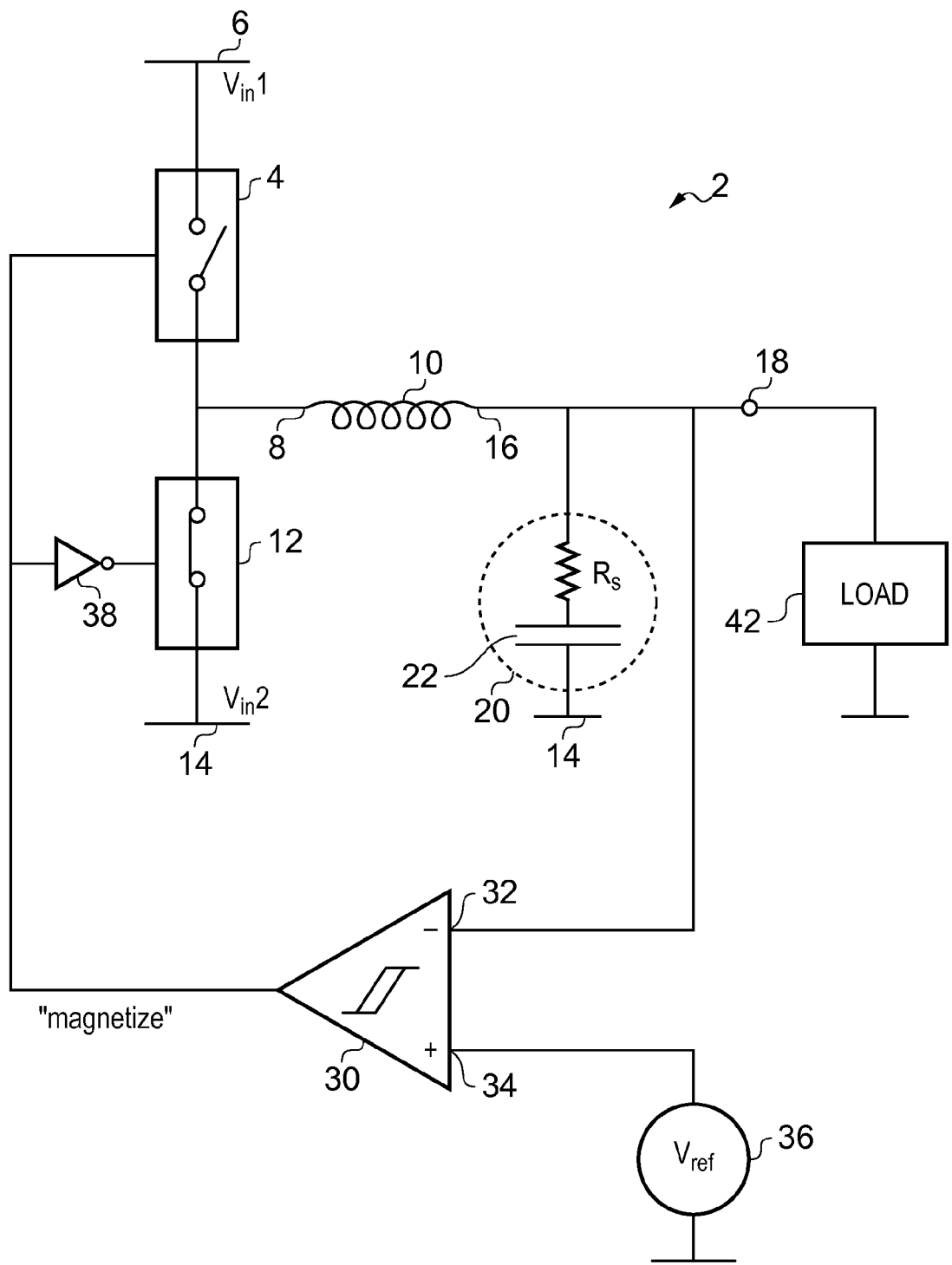
FIG. 6 is a circuit diagram of a prior art hysteretic buck converter.

FIG. 6 illustrates a prior art hysteretic buck converter, i.e. a converter having a comparator that exhibits hysteresis. The construction and operation of such a circuit will be briefly discussed to aid the reader. The buck converter, generally indicated 2, comprises a switching arrangement typically formed by a first electrically controllable switch 4 connected between a first supply 6 having a voltage Vin1 and a first terminal 8 of an inductor 10, and a second electrically controllable switch 12 connected between the first terminal 8 of the inductor 10 and a second supply 14 having a voltage Vin2. A second terminal 16 of the inductor 10 is connected to an output node 18 of the buck converter. The second terminal 16 of the inductor 10 is also connected to a store 20. The store 20 comprises a capacitor 22 having a first terminal connected to the output node 18 and a second terminal connected to a voltage supply, such as the first supply 6 or the second supply 14, or even to a further supply if desired. As illustrated in FIG. 6, the second terminal of the capacitor is connected to the second supply Vin2.

The capacitor 22 is a real component rather than an ideal component and hence exhibits an equivalent series resistance $R_S$ which, in the arrangement shown in FIG. 6, has been drawn as being in series with the idealized capacitor 22.

A hysteresis comparator 30 has a first input 32 connected to the output node 18 of the buck converter so as to monitor a feedback voltage, which in this example is identical to the converter output voltage. A second input 34 of the comparator is arranged to receive a reference voltage Vref from a reference voltage source 36. The comparator 30 outputs a control signal "magnetize" which is used to control the operation of the first electrically controlled switch 4. An inverter 38 is provided to receive the "magnetize" signal at its input and to produce an inverted version which is used to control the second electrically controllable switch 12. When "magnetize" is asserted the first switch 4 is in a low impedance state so as to build current within the inductor.

The electrically controllable switches 4 and 12 may, for convenience, be implemented as field effect transistors.

In use the hysteresis comparator 30 compares the feedback voltage which is representative of the output voltage of the buck converter with Vref and outputs the magnetize control signal on the basis of the comparison. Because the switches 4 and 12 are driven in anti-phase when the first switch 4 is "on" (i.e. in a low impedance state) the second switch 12 is "off" (i.e. in a high impedance state) and when the second switch 12 is on the first switch 4 is off.

Although not shown, additional switch driving circuitry may be implemented to ensure that the switches 4 and 12 cannot be on at the same time even for even the briefest moments, during the switching transitions of the switches. Additionally the switching control circuit briefly allows both switches to be in an off state and consequently a fly back diode, also known as a free-wheeling diode, (not shown) is provided in parallel with the second switch 12 in order to automatically provide a current path between the second supply 14 and the inductor 10 during those moments when both switches are temporarily in the "off" condition. A further flyback diode is also provided in parallel with the first switch 4 in order to provide a current flow path to protect that switch in the event of current flow in the inductor reversing. The flyback diodes may be included within the switches 4 and 12, and may be body diodes of FETs. The output of the buck converter is, in use, connected to a load 42.

In general, though not necessarily, Vin1 is a positive voltage provided from a power source such as a battery, and the terminal Vin1 is connected to the anode of the battery. Vin2 is generally a local ground, and is connected to the cathode of the battery, and hence for the rest of this discussion will be regarded as being zero volts. The second terminal of the capacitor 22 is also connected to the local ground, as is the load 42.

In use, the comparator 30 compares the feedback voltage $V_{FBK}$ which in this example is the output voltage Vout with the reference voltage Vref. If Vout is smaller than Vref then the first switch 4 is turned on and the second switch 12 is turned off. This connects the first terminal of the inductor to Vin1.

As Vin1 is greater than Vout, because the converter is a buck converter (Vout<Vin1), this causes the current I flowing in the inductor 10 to increase, with the rate of current change being $$\frac{dI}{dt} = \frac{Vin1 - Vout}{L}$$

where L is the inductance of the inductor.

As the current builds some of it goes to power the load and some of the current flows into the capacitor 22 where the charge is stored. As a result the output voltage of the capacitor increases $$\Delta Vout = \frac{I_{capacitor}}{C} \cdot t$$

where $I_{capacitor}$ is the current flow to the capacitor, and C is the capacitance of the capacitor, and t is the time over which the change in output voltage is measured.

Once the output voltage (or the feedback portion of it) has exceeded the reference voltage by a margin determined by the hysteresis of the hysteresis comparator 30, then the control signal "magnetize" changes so as to cause the first switch 4 to switch off and the second switch 12 to switch on. This connects the first terminal 8 of the inductor 10 to ground. The current in the inductor is still flowing, but now the rate of change of the magnitude of the current starts to decrease, as given by $$\frac{dI}{dt} = \frac{-Vout}{L}$$

Consequently the current delivered to the load 42 and the capacitor 22 starts to fall. This eventually causes the output voltage to drop until such time as the comparator switches the first switch 4 back on and the second switch 12 off. Thus the control cycle is repeated.

Whilst such a scheme is simple it will be seen that, in control theory terms, the inductor acting as an integrator forms a "pole" and the capacitor acting as an integrator also forms a pole. This gives rise to potential instabilities in the control loop formed by the comparator 30, especially if the value of the capacitor 22 is relatively low. Put another way, if instability arises, then the instability may generally be cured by increasing the value of the capacitor 22, but this is not always desirable because a larger capacitor generally incurs more cost or takes up more space, which may be critical in space constrained electronic devices, such as mobile phones, mobile computers, media players and so on.

Figure 7:
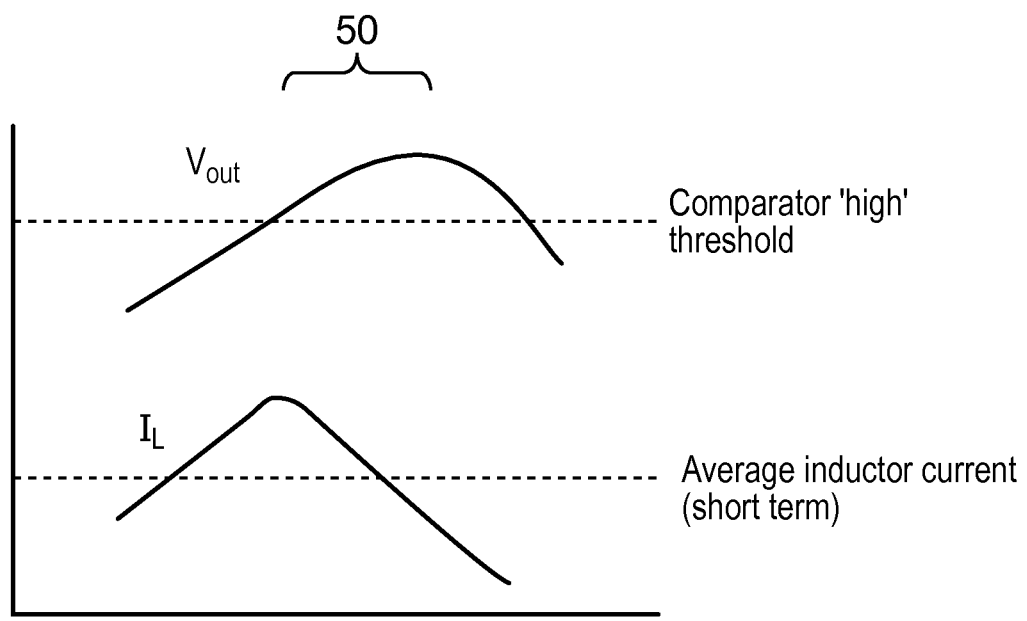
FIG. 7 is a graph illustrating the overshoot of output voltage as a result of poor regulation under certain conditions for the prior art hysteretic buck converter of FIG. 6.

The nature of the instability will now be described with reference to FIG. 7. Once the upper threshold "comparator high threshold" is reached the comparator 30 makes its switching decision, and initiates turning the first switch 4 off and the second switch 12 on. However this takes time and as a result the current does not start to decay instantly. Furthermore, even when the current decay is started (i.e.

$$\frac{dI}{dt}$$

becomes negative) the current is still charging the capacitor and as the instantaneous inductor current is greater than the current drawn by the load the voltage continues to rise for a while as shown in region 50 of the FIG. 7. An equivalent phenomenon occurs at the end of the discharge cycle when the voltage drops causing the voltage on the capacitor to drop lower than the hysteresis decision threshold. This can give rise to an undesirable ripple voltage at the output of the converter, or worse still instability within the control loop as the errors can accumulate over time.

For older capacitor technologies, such as tantalum capacitors the equivalent series resistance $R_s$ was relatively high, say 100 mΩ, and this added an additional voltage corresponding to $R_s \times I_{capacitor}$ which tended to cause Vout to be overestimated when driving the current build and potentially underestimated when reducing the current, and this acted to dampen out the potential instability within the buck converter.

However, as capacitors have improved and ceramic capacitor technology has taken the place of tantalum electrolytic capacitors then for a capacitor of a given size the equivalent resistance has decreased, typically to around 10 mΩ for a one or 2 μF capacitor. This reduction in resistance, which would generally be expected to be a good thing, coupled with customer led demand for use of smaller capacitors for space and cost problems has highlighted the instability issue.

The inventors realized that the circuit stability of the buck converter can be restored by synthesizing a correction signal that reproduces the effect of the voltage fluctuation across the capacitor resulting from its relatively large equivalent series resistance, as was naturally the case with older capacitor technologies.

In order to consider the synthesis of this correction signal, it is reasonable to make the assumption that the current in the load is slowly varying compared to the cycle time of the buck converter. Then, working on this assumption it follows that the load current can be regarded as invariant, and any change in inductor current $I_L$ causes a corresponding change in the current flowing to (or away) from the capacitor 22.

Therefore, during the current build phase (when magnetize is asserted and the first switch is on) then the change in voltage attributable to the equivalent series resistance is $$\frac{dVout}{dt} = R_s \cdot \frac{dI_L}{dt} = R_s \frac{(Vin - Vout)}{L}$$

There will, of course, also be a change in voltage due to the charging or discharging of the capacitor 22 as a result of the difference between the current through the inductor 10 and the current supplied to the load which is given by:

$$\frac{dVout}{dt} = \frac{I_{capacitor}}{C}$$

and, during the current decrease period when magnetize is low and the first switch 4 is off (switch 12 is on) then the change in voltage due to the equivalent series resistance is $$\frac{dVout}{dt} = R_s \cdot \frac{dI_L}{dt} = R_s \cdot \frac{-Vout}{L}$$

By generalizing the equations such that Vin2 is not necessarily zero, the voltage difference at the first terminal of the inductor can be represented by $V_{(sw)}$=Vin1 or Vin2, depending on where the circuit is in its operating cycle.

Therefore $$\frac{dVout}{dt} = R_s \cdot \frac{(V_{(sw)} - Vout)}{L}$$

and by integrating we get $$\Delta Vout = \frac{R_s}{L} \int (V_{(sw)} - Vout) \cdot dt$$

This represents a correction signal that it is desired to generate.

The inventors realized that it may be advantageous to add the correction signal within the comparator itself rather than seeking to modify the signals presented to the input of the comparator. This approach affords more flexibility in terms of implementation and avoids adding additional circuitry before the comparator which might introduce further delays or phase shifts to the monitored voltage signal which as noted before already includes an AC component, and which might therefore further degrade loop stability.

Figure 1:
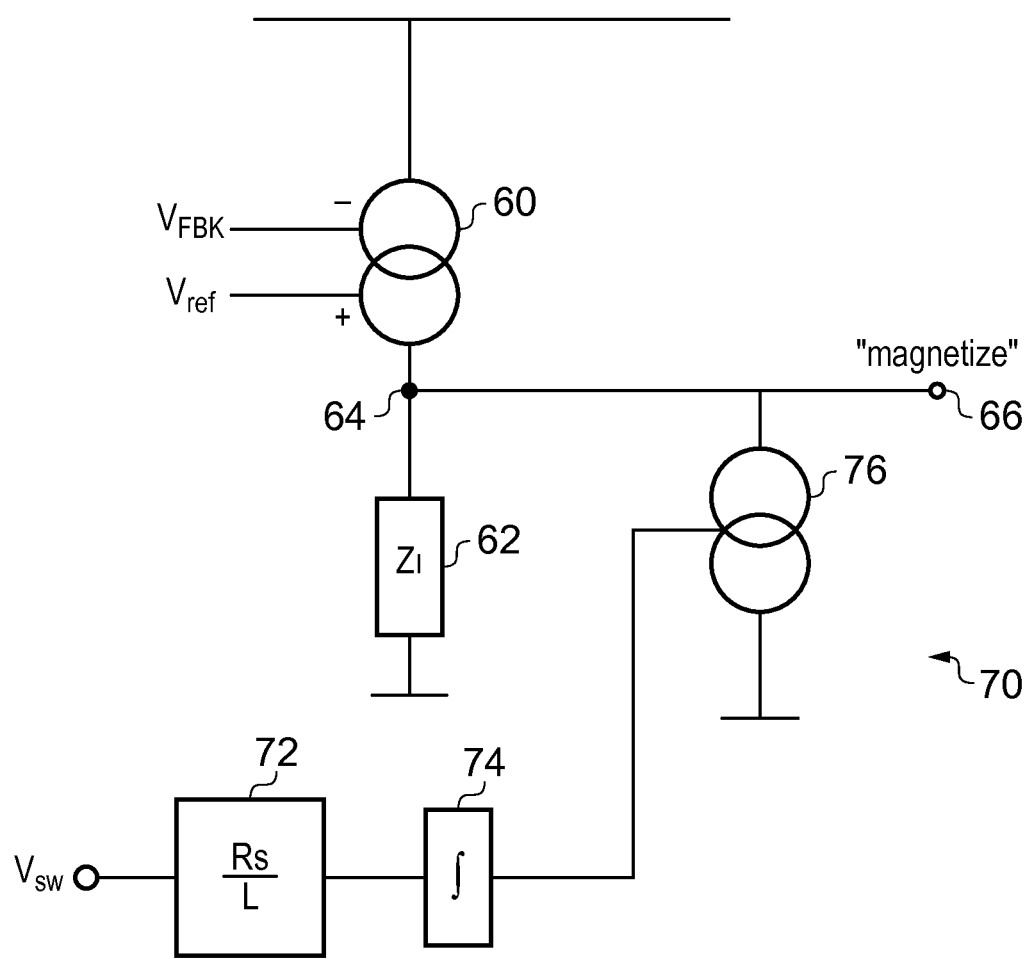
FIG. 1 schematically represents a comparator including a modification circuit for use in a buck converter constituting an embodiment of the present invention.

FIG. 1 schematically illustrates a modified comparator constituting an embodiment of the present invention. It is to be assumed that the comparator exhibits hysteresis, and the components providing hysteresis have been omitted for clarity.

A controllable current source 60 forms a current as a function of a difference between Vref and $V_{FBK}$, where $V_{FBK}$ is a feedback signal that can be an attenuated version of $V_{out}$ or the entirety of Vout. The current source 60 is connected to a load 62 having an impedance Z1 at a node 64 so that the current flowing through the current source can be converted to the control signal "magnetize" and be supplied to the first electrically controllable switch, and its complement magnetize is provided to the second electrically controllable switch. The load 62 is preferably an active load. In practice extra buffers may be inserted between the node 64 and the magnetize output node 66.

A correction signal is added to the "magnetize" signal by a modification circuit, generally designated 70, in order to modify it.

The modification circuit 70 receives a modification circuit input signal. The modification circuit input signal may be the voltage $V_s$, delivered to the first terminal of the inductor at its input. Alternatively, as will be shown later, a representation of the signal at the first terminal of the inductor can be inferred from the switching control signal "magnetize" or equivalent signals. The input which for simplicity will be assumed to be $V_{(sw)}$ is multiplied by a scaling factor $$\frac{R_s}{L}$$

at stage 72 and is then integrated by an integrator 74. As will be shown later, this can be performed in a single stage.

The output of the integrator 74 is a voltage that is then provided to an input of a voltage controlled current flow device, such as a current sink 76, or a voltage controlled current source depending on the specification implementation of the modification circuit.

Thus the current passed by the input stage 60 of the comparator is modified by a correction value given by $$Imod = -gm \cdot \frac{R_s}{L} \int V_{(sw)} \cdot dt$$

where:

Imod is the correction current produced by the modification circuit; and gm is the transconductance of the voltage controlled current flow device.

The changing current drawn from the output signal "magnetize" (or at least at the node 64) can notionally be reflected back via the transconductance of the input stage 60 to being equivalent to a voltage change introduced at the input to the comparator, said voltage being representative of the integrated voltage $V_{(SW)}$. Thus it becomes possible to synthesise within the control circuit a series resistor $R_s$ in series with the output capacitor 22 to modify the behavior of the control loop of the buck converter without actually having to endure the disadvantages of a series resistor of a larger size actually existing within the circuit.

The current inside the comparator and presented to the load 62 having impedance Z1 is represented by $$I_{Z1} = gm\left(Vref - \left[Vout + \frac{R_s}{L} \int V_{(sw)} \cdot dt\right]\right)$$

where $I_{Z1}$ is the current in the impedance Z1.

Figure 2:
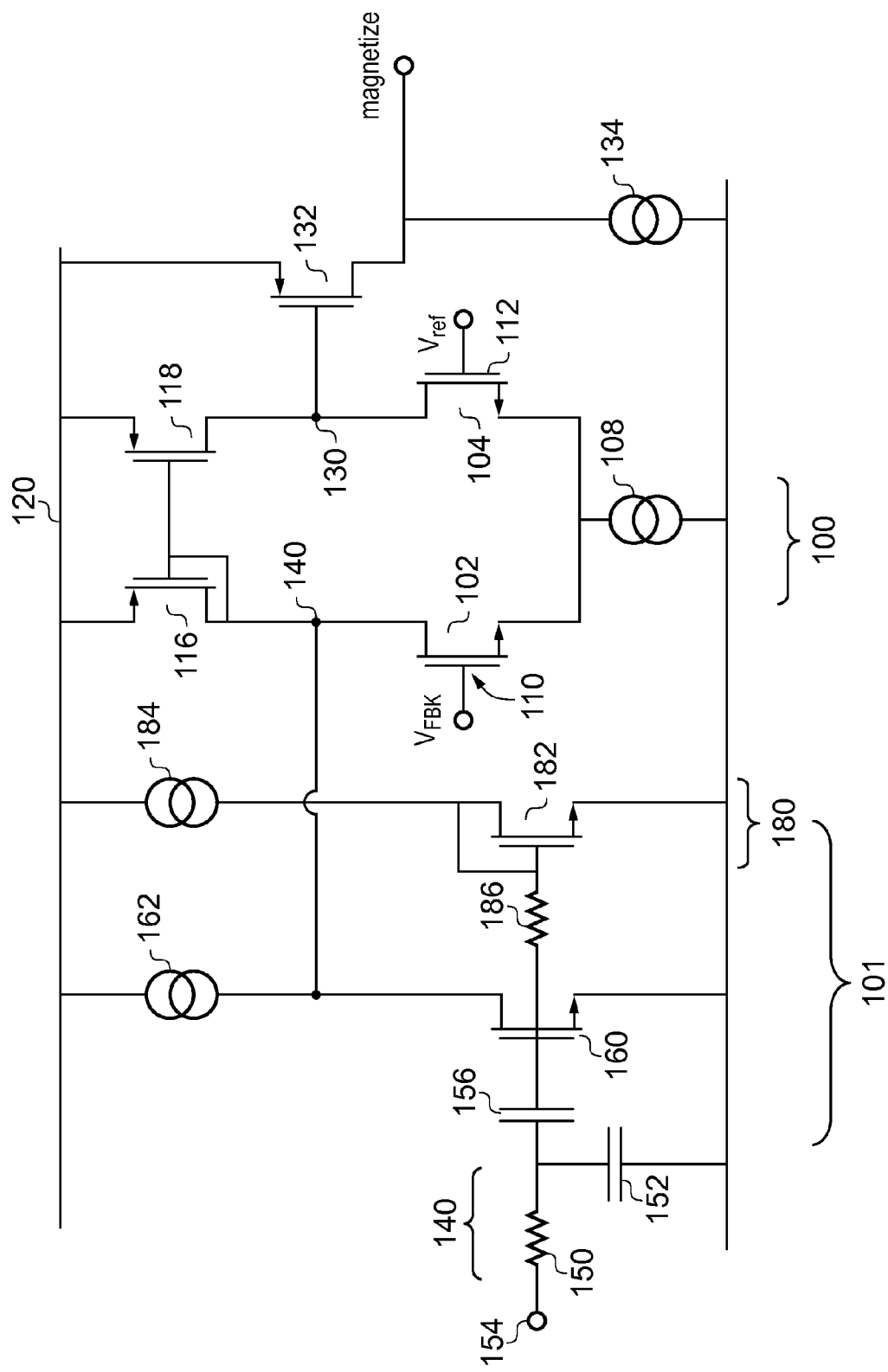
FIG. 2 is a circuit diagram showing an implementation of the circuit shown in FIG. 1 in greater detail.

FIG. 2 illustrates an embodiment of the arrangement shown in FIG. 1. FIG. 2 shows a comparator input stage, generally designated 100, in combination with a modification circuit, generally designated 101. The modification circuit 101 can be formed as an integral part of the comparator or can be connected to it via additional inputs. The comparator exhibits hysteresis and this can be achieved either by adding additional components internally to the comparator so as to give it hysteresis or by feeding back a portion comparator output, i.e. the of the magnetize signal to the reference input of the comparator.

The comparator input stage is a differential pair. Such a circuit is well known to the person skilled in the art. However, for completeness, an exemplary implementation of the differential pair as shown in FIG. 2 will be described in detail. The differential pair comprises a first NMOS field effect transistor 102 having a source thereof connected to a source of a second NMOS field effect transistor 104 and also to a current sink 108.

A gate 110 of the first NMOS field effect transistor 102 forms the first input 32 of the comparator 100, whereas a gate 112 of the second NMOS field effect transistor 104 forms a second input 34 of the comparator. Drains of the first and second field effect transistors 102 and 104 are connected to respective loads which, in order to achieve a high gain need to present a high impedance while still passing the current needed to run the differential pair.

In order to achieve this, active loads are provided comprising a pair of PMOS transistors 116 and 118 having their sources connected to the positive supply rail 120, their gates connected together, and the gate of the first transistor 116 connected to the drain of the first transistor 116, with the drain of transistor 116 being connected to the drain of transistor 102. Similarly the drain of the transistor 118 is connected to the drain of the transistor 104. The transistors 116 and 118 act as a current mirror, with transistor 116 acting as the "master" device and transistor 118 seeking to pass a current which minors that of the current passing through transistor 116.

A node 130 formed by the connection of the drain of transistor 118 to the drain of transistor 104 acts an output node of the differential pair. The output node provides an input to an inverting buffer formed by a PMOS transistor 132 in combination with a current sink 134. This prevents unknown current flows occurring at the output node 130.

The modification circuit 101 is attached to a node 140 formed by the connection of the drain of transistor 102 to the drain of the transistor 116. The modification circuit 101 allows current to be drawn from or injected at the node 140 thereby modifying the operation of the differential pair in a way which has an effect which is similar to modifying one of the input voltages presented at the gates 110 and 112 of the transistors 102 and 104 respectively.

The modification circuit 101 comprises an integrator 140 formed by a series combination of a resistor 150 and a capacitor 152. A first end of a resistor 150 is connected to an input node 154 which, in use, is connected to receive the switching signal $V_{(sw)}$ that occurs at the first end 8 of the inductor 10 shown in FIG. 6. The second terminal of the resistor 150 is connected to a first terminal of the capacitor 152, and a second terminal of the capacitor 152 is connected to ground. In use the signal $V_{(sw)}$ transitions between Vin and zero volts so it can be seen that the integrated signal occurring across the capacitor 152 comprises both a DC component and an AC component. The DC component is unwanted, so a DC blocking capacitor 156 is connected to the output of the integrator 140 so as to block the DC component and to only pass the AC component to a transconductance stage formed by a field effect transistor 160 in combination with a current source 162. The action of the field effect transistor 160 is to convert the alternating ripple that passes through the blocking capacitor into a current ripple. In order to do this, a gate of the transistor 160 is connected to receive the signal from the DC blocking capacitor 156, the source of the transistor 160 is connected to ground, and the drain of the transistor 160 is connected to the current source 162. The drain of the transistor 160 is also connected to the node 140 of the comparator. Since the current source 162 passes a steady current, any excess or shortfall in current between that from the current source and that passed by the transistor results in current injection or current removal from node 140.

In order to ensure reliable operation, the transistor 160 needs to be biased to a suitable operating voltage. The biasing is provided by a bias circuit, generally designated 180 which comprises a further field effect transistor 182 in series with a current source 184. The transistor 182 has its gate and drain connected together, and its source connected to ground. This arrangement is sometimes referred to as a "diode" configuration and the voltage at the gate of the transistor floats to whatever value is necessary in order to pass the current set by the current source 184. The gate of the transistor 182 is connected to the gate of the transistor 160 by a relatively large resistor 186 such that the biasing circuit 180 imposes a DC voltage at the gate of the transistor 160 which then has an AC ripple superimposed on it. If the transistor 182 is of the same size as the transistor 160, then the current sinks 162 and 184 should also pass the same current. However, as is known to the person skilled in the art such current mirror like configurations do not need to have transistors of the same size and suitable scaling of the transistor 182 and the current passing through the current mirror 184 may be applied to set the DC bias in the transistor 160 to any suitable desired value. In this example both transistors 160 and 182 are NMOS devices, but this need not have been the case. It is, however advantageous that they are similar to the input transistors 102 and 104.

Returning to consider the input stage integrator formed by the resistor 150 and the capacitor 152, these components have values $R_i$ and $C_i$ respectively and they determine a time constant of the integrator. This should be substantially matched to the value of the time constant $$\frac{R_s}{L}$$

formed by the inductor and equivalent internal resistance of the capacitor of the buck converter shown in FIG. 6.

The effect of the modification circuit 101 is to inject a current ripple, whose value is given by $$\Delta I = \frac{gm}{R_i C_i} \int V_{(sw)} \cdot dt$$

into the comparator
where gm is the transconductance of transistor 160.

For simplicity it may be assumed that the transconductance of each of the transistors 110, 112, 160 and 182 is the same, although with further numerical analysis this limitation need not be upheld.

The current passed through the current sources 162 and 184 should be reasonably small compared to the current set by the current sink 108 but large enough to accommodate the value of the AC ripple current which may be in the tens of micro amps, say 30 μA or so One feature of the buck type hysteretic converter shown in FIG. 2 is that the switching frequency is not well defined, but is a function of the difference between the switching thresholds of the hysteresis comparator. Thus, if the thresholds are relatively far apart the switching frequency is relatively low, whereas if the switching thresholds are closer, then the switching frequency increases.

The buck converter, even when utilizing the modification circuit discussed with respect to FIGS. 1 and 2 still has a ripple voltage which might potentially act as an interferer with wanted signals in the load circuit if it remains uncontrolled. The interference can be regarded as originating from the switching of the input side of the inductor, and this frequency is unpredictable if no steps are taken to control it.

Figure 3:
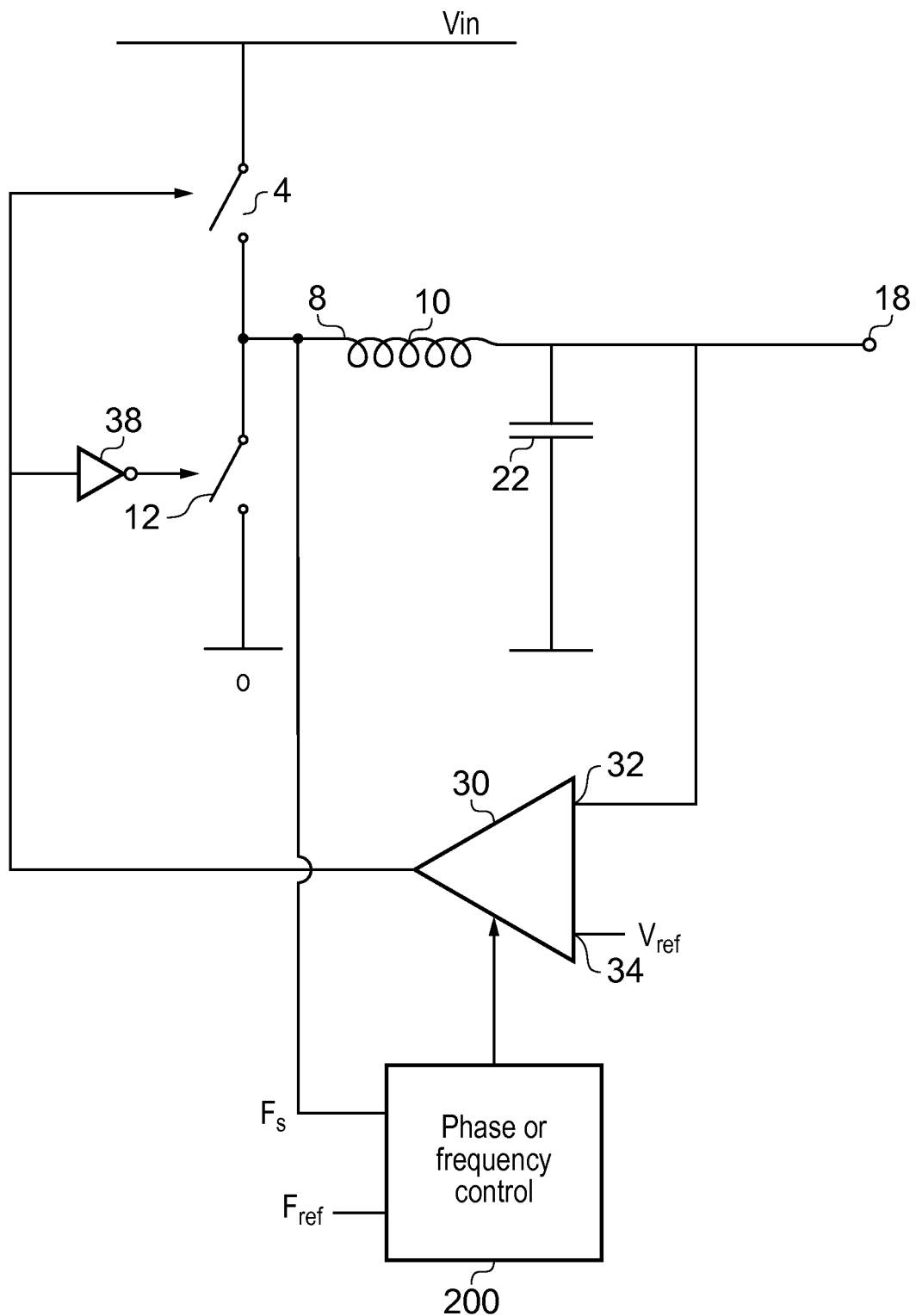
FIG. 3 illustrates a further embodiment of the present invention further comprising a frequency control circuit for controlling the switching frequency of the buck converter.

FIG. 3 shows a further embodiment in which hysteresis modification signals are provided to the hysteresis comparator 30 (although as will be shown later they may be applied to the modification circuit) by a phase or frequency controller 200 so as to vary the amount of hysteresis exhibited by the comparator 30, and thereby to modify the switching frequency of the buck converter. This embodiment may be used alone, or advantageously in combination with the earlier embodiment. It should be noted that the frequency controller 200 could be used to modify the input signals, for example $V_{ref}$ to control the amount of hysteresis.

In principle, the switching frequency $F_s$ of the voltage $V_{sw}$ at the first end 8 of the inductor 10 is sensed and compared to a reference frequency $F_{ref}$. This comparison may be done in either the frequency or phase domains, and the choice is at the discretion of the circuit designer. Phase comparison involves comparing the time at which the input signal $V_{sw}$ switches with respect to the phase of reference signal, and thereby determining whether the input signal $v_{sw}$ is switching in advance of or behind the reference signal. Frequency comparison may be performed by driving a counter, for example, a down counter, and counting each transition of the switching frequency $V_{sw}$ for a period of time whose duration is determined by the frequency of the frequency reference, $F_{ref}$. At the end of the predetermined time period, the counter is examined to see whether it has a positive or a negative value. If it has a positive value, then the switching frequency could be seen to be too low and hence the difference between the comparator switching thresholds needs to be reduced; whereas if the counter has negative value then the switching frequency is too high and the difference between the comparator switching thresholds needs to be increased. Equivalent schemes will be evident to the person skilled in the art for performing phase or frequency analysis of the switching rates.

Figure 4:
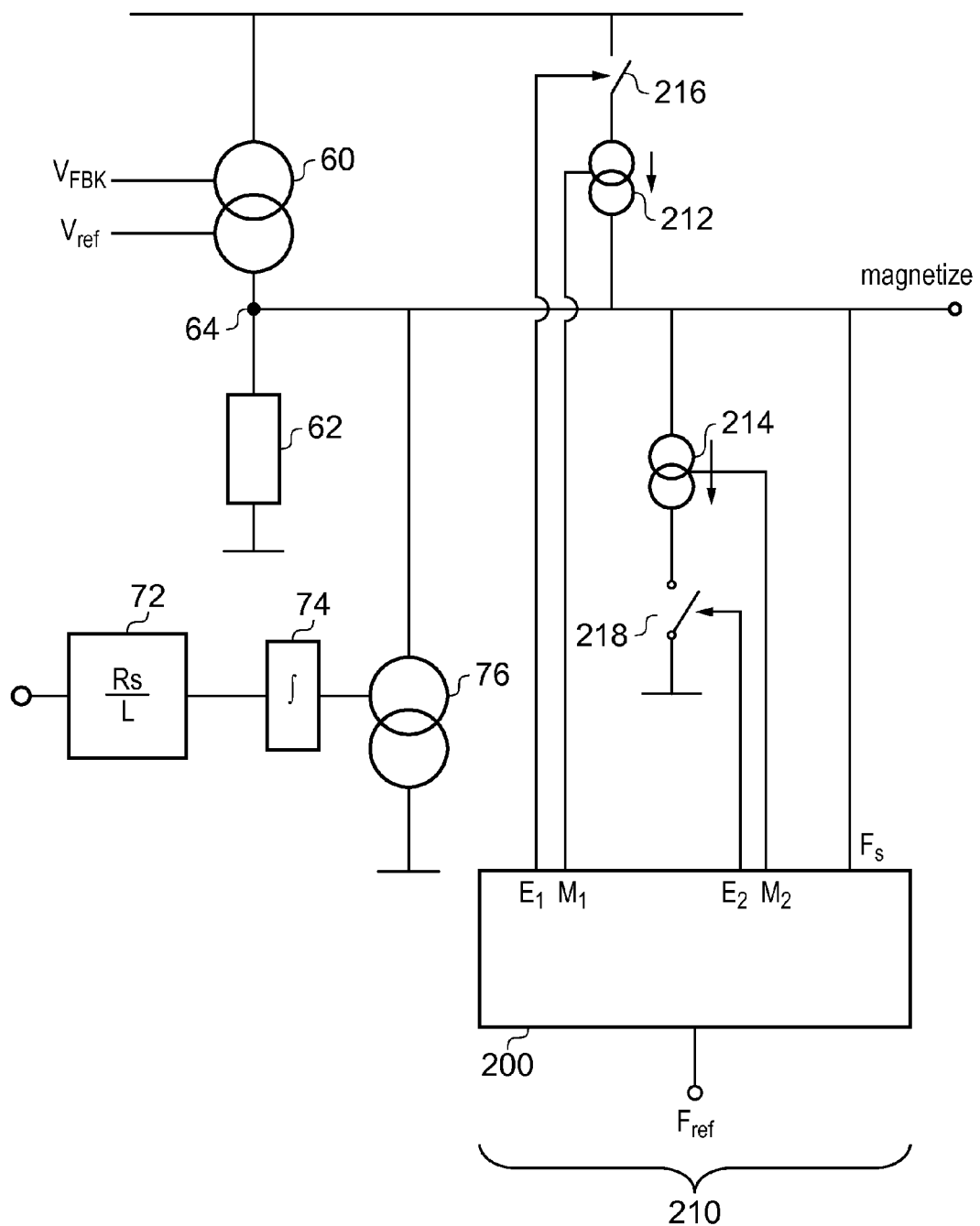
FIG. 4 shows a more detailed implementation of the circuit of FIG. 3.

The arrangement shown in FIG. 4 adds a frequency control block 210 to the modification circuit which had previously been described with respect to FIG. 1. As before, this is only one example of how the control may be implemented and other techniques such as modifying the value of the input signals to add or subtract values dependent on magnetize are possible.

A frequency or phase comparator, as appropriate, 200 receives the frequency reference and the switching frequency at inputs $F_{ref}$ and $F_{in}$, respectively, and uses this to determine whether the comparator thresholds should be made further apart or closer together. It can do this by either sourcing current to or sinking current from the output "magnetize" or an internal node because, as explained before, these changes in current can be reflected back through the transconductance of the input stage to represent modifications to the voltages presented at the first and second inputs of the comparator. The controller can control the operation of two current control devices 212 and 214 with the current control device 212 being arranged to push current towards the "magnetize" signal line, i.e. node 64, and the current control device 214 being arranged to sink current from the "magnetize" signal line (node 64). The current control devices may be current sources which are independently controllable in order to control both the magnitudes of the currents, as set by control signals M1 and M2 respectively, and also to enable or disable the current sources 212 and 214 as schematically indicated by control signals E1 and E2 supplied to respective electrically controllable switches 216 and 218 provided in series with the current sources 212 an 214, respectively. The signals E1 and E2 may be directly derived from the "magnetize" signal (or node 64) and supplied in non-inverted and inverted forms, as appropriate, to the switches. The signals M1 and M2 are preferably voltage signals which are converted into the current domain by the transconductance exhibited by the devices implementing the current control devices 212 and 214. If, for example, the circuit designer chooses to implement the current control devices as FETs, and to allow the feedback loop to operate to adjust the gate voltages of the FETs to pass a desired current then the current control signals and the enable signals can be implemented simultaneously by the signals provided to the transistors.

Figure 5:
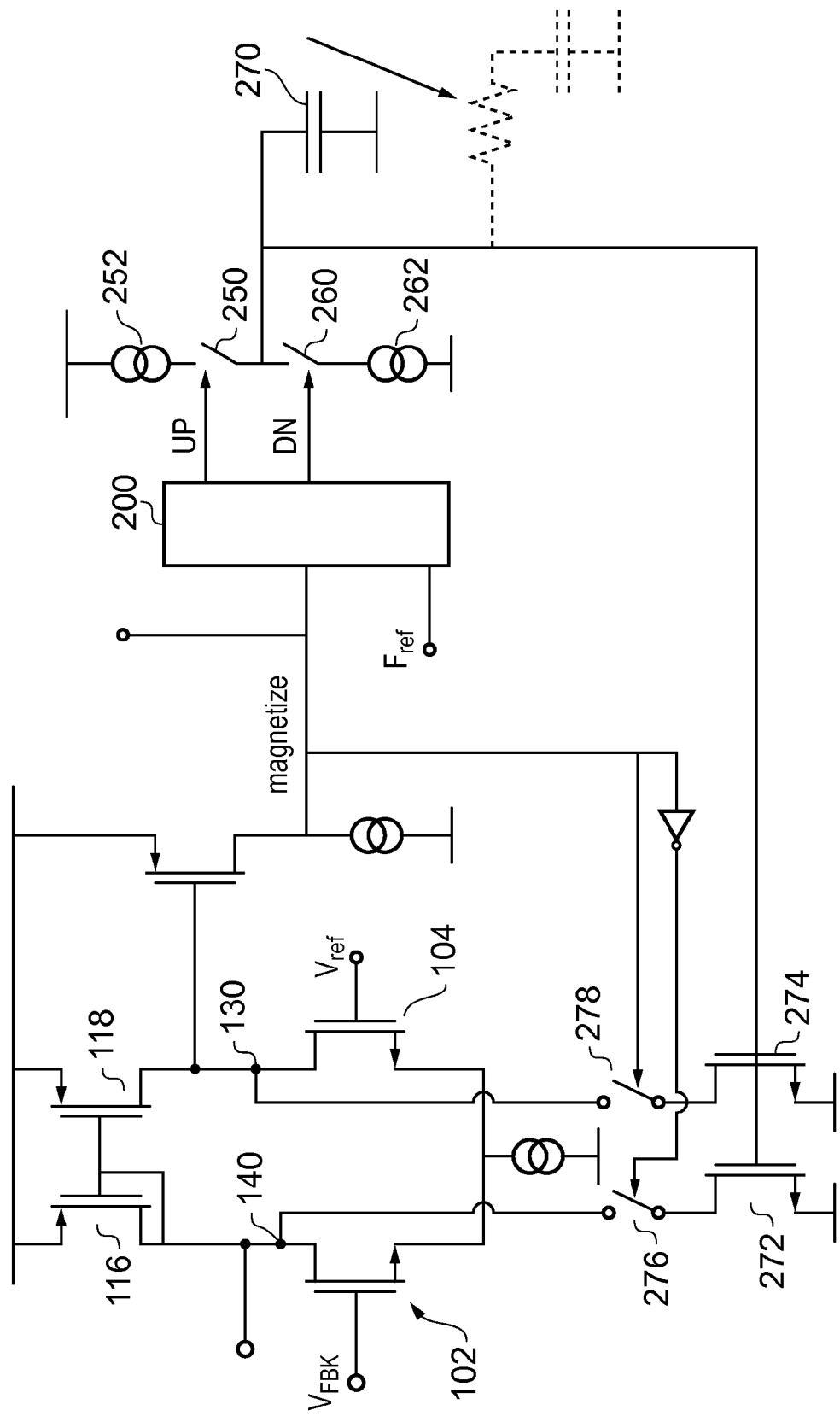
FIG. 5 shows an exemplary implementation of the frequency modification circuits shown in FIG. 3 and FIG. 4.

FIG. 5 is a circuit diagram showing an implementation of the switching frequency control circuit of FIG. 4 in greater detail. The circuit is attached to a differential pair of the comparator stage which corresponds to that described with reference to FIG. 2 and where like reference numerals have been used to refer to like parts. As can be seen the phase comparator 200 has, in this example, been connected directly to the "magnetize" signal and compares the frequency of this with the frequency reference Fref to generate "up" and "down" signals which control electrically controllable switches 250 and 260 respectively. The switches 250 and 260 are in series connection with each other and also with current source 252 and current sink 262 as illustrated in FIG. 5. The "up" and "down" signals are mutually exclusive so that they cannot be asserted at the same time. Thus, the controller 200 acts to either cause current to be pushed towards a integrator 270 (which may often also include an RC stage shown in outline) or drawn from the integrator 270 depending on whether switch 250 is closed or whether switch 260 is closed. The integrator 270 integrates the current pushes or current pulls to form a voltage signal which is provided to the gates of field effect transistors 272 and 274 which use their transconductance to act as voltage to current converters. The drain of the transistor 272 is connected to node 140 via an electrically controllable switch 276. Similarly a drain of the transistor 274 is connected to node 130 by an electrically controllable switch 278. The switches 276 and 278 are driven in anti-phase by the "magnetize" signal. The circuit thereby acts to effectively add a further modification voltage into the comparator, thereby effectively modifying between the switching thresholds of the comparator. The arrangement shown in FIG. 5 can be used in conjunction with the modification circuit shown in FIG. 2 such that both stability control and frequency control can be performed by modifying the operation of the comparator without having to impose or attach any other components in the signal path to the inputs of the comparator.

Although in some embodiments, such as that of FIG. 4 both the current source and current sink (if that is chosen as the implementing technology) are shown as variable, the invention will also work if one of them has a fixed magnitude of current flow.

Figure 8:
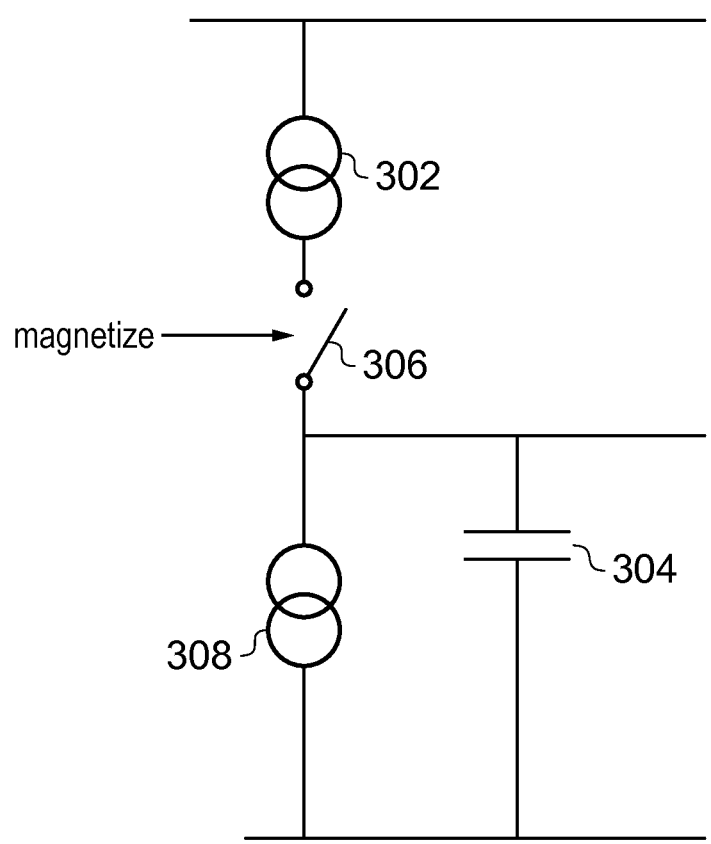
FIG. 8 is a circuit diagram of a circuit for emulating the integration of the switch signals.

The integrated values of the switching signals can be synthesized rather than measured when, for example, the supply voltage to be converted only changes over a relatively small range. Since the output voltage is assumed to be constant then current sources and sinks can be used to charge a capacitor directly to obtain an integrated version of the switch signal. Thus, as shown in FIG. 8 an emulation circuit comprises a current source 302 that selectively passes a current to emulate connecting the first terminal of the inductor to the positive supply voltage, $V_{in}$. The current from the current source is supplied to a capacitor 304 via a switch 306 which is electrically controlled in response to the magnetize signal. The current source may produce a current which is proportional to the input voltage $V_{in}$. A further current source 308 is connected in parallel with the capacitor 304, and passes a current which is proportional to $V_{out}$, with the constants of proportionality for the current sources 302 and 308 being the same. Thus when switch 306 is closed a current having a value $G_m(V_{in}-V_{out})$ is supplied to the capacitor, and when switch 306 is non-conducting a current of $-G_m \cdot V_{out}$ is supplied to the capacitor. As a consequence the behavior of the inductor 10 (FIGS. 3 and 6) which integrates a voltage into a current is emulated by the capacitor 304 integrating a current into a voltage.

Optionally, for example for use at power up, a shorting switch (not shown) may be provided to discharge the capacitor to a known initial condition.

The scaling factors, $R_i$ and $C_i$, may be programmable or otherwise adjustable to enhance performance by matching these parameters with desired synthesized resistances $R_s$, and with actual values or estimates or inductance L used in the converter.

The embodiment shown in FIG. 5 introduced the frequency control via connections made to nodes between the transistors on each side of the differential pair, and their respective loads, as implemented by transistors 116 and 118. The embodiment shown in FIG. 2 added a correction signal to the node between transistor 102 of the differential pair and the load implemented by transistor 116.

Figure 9:
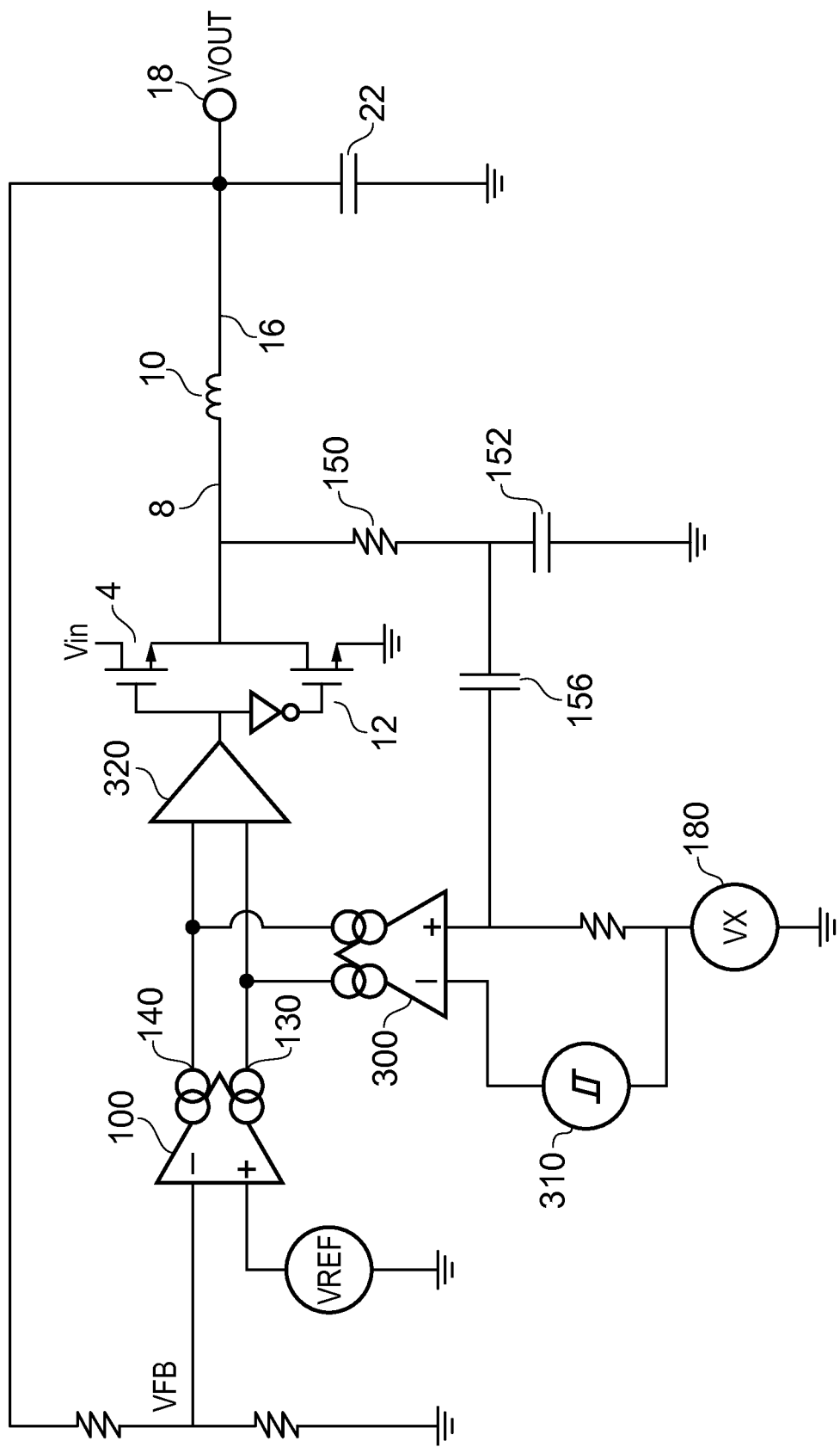
FIG. 9 is a circuit diagram of a buck regulator constituting a further embodiment of the invention.

These approaches can be combined in a further embodiment schematically illustrated in FIG. 9. Like parts have been designated with the reference numerals. Thus, comparing FIG. 9 with FIG. 2, the comparator 100 receives a version (possibly attenuated) of the output voltage at an inverting input thereof, which may be implemented using a differential pair as illustrated in FIG. 2. A voltage reference defining the target output voltage of the buck converter is provided to a non-inverting input of the comparator 100

The comparator 100 may have two output nodes that can source or sink current. These output nodes can be considered as being equivalent to the nodes 130 and 140 of the circuit shown in FIG. 2.

The correction signal to the comparator 100 is added by current injection/extraction from the nodes 130 and 140 by a current mode amplifier 300 which receives a low pas filtered version of the voltage ripple from an RC filter formed by resistor 150 and capacitor 152, as was also shown in FIG. 2, which is the DC blocked by capacitor 156. The nodes 130 and 140 can be regarded as being summing nodes. The DC blocked ripple signal may be summed with a bias voltage Vx from a bias voltage generator 180 so as to centre the AC ripple voltage about a convenient DC mid point for the operation of subsequent signal processing circuitry, as implemented by the amplifier 300.

As shown in FIG. 9, the AC ripple voltage as superimposed on the bias voltage Vx, is provided to a first input, which in this example is the non-inverting input, of the amplifier 300. The amplifier 300 is a differential transconductance amplifier.

A second input of the amplifier 300 receives the sum of voltage Vx and a hysteresis voltage generated by a hysteresis signal generator 310. The hysteresis signal generator 310 may add a square wave signal which has a "mark" or asserted value when the first terminal 8 of the inductor 10 is connected to Vin1 and a "space" or unasserted value when the first terminal 8 of the inductor is connected to Vin2. It can be seen that the hysteresis signal generator can be driven from monitoring the first terminal 8 of the inductor 10, or it may be driven from magnetize signal or an internal node of the comparator.

As noted before, the difference between hysteresis thresholds can be varied to modify the switching frequency of the buck converter. In the arrangement shown in FIG. 5, for example the phase comparator 200 in combination with the current source 252 and switch 250, and current sink 262 and switch 260, enable a voltage to be stored on the capacitor 270 which is representative of a change that should be made to the difference between the switching thresholds of the comparator in order to set the hysteresis that is exhibits to the desired level to set the switching frequency to a desired frequency. The voltage stored on the capacitor 270 may be added to Vx as a square wave signal by a suitable summing arrangement. In one embodiment this may be achieved by connecting the lower plate of capacitor 270 (as shown in FIG. 5) to Vx as output by the bias voltage generator 180 as shown in FIG. 9. Switches driven in time with the magnetize signal can then connect either the bottom plate or the top plate of the capacitor 270 to the second input of the amplifier 300, thereby providing a hysteresis signal that, by virtue of controlling its magnitude, can control the control switching frequency of the converter.

The current flows at nodes 130 and 140 cause the voltages at the nodes to vary, and these changes can be monitored by a second comparator block 320 connected to nodes 130 and 140 which compares the voltages and outputs a control signal, for example the magnetize signal, that controls the switches 4 and 12, which in FIG. 9 are drawn as field effect transistors.

Figure 10:
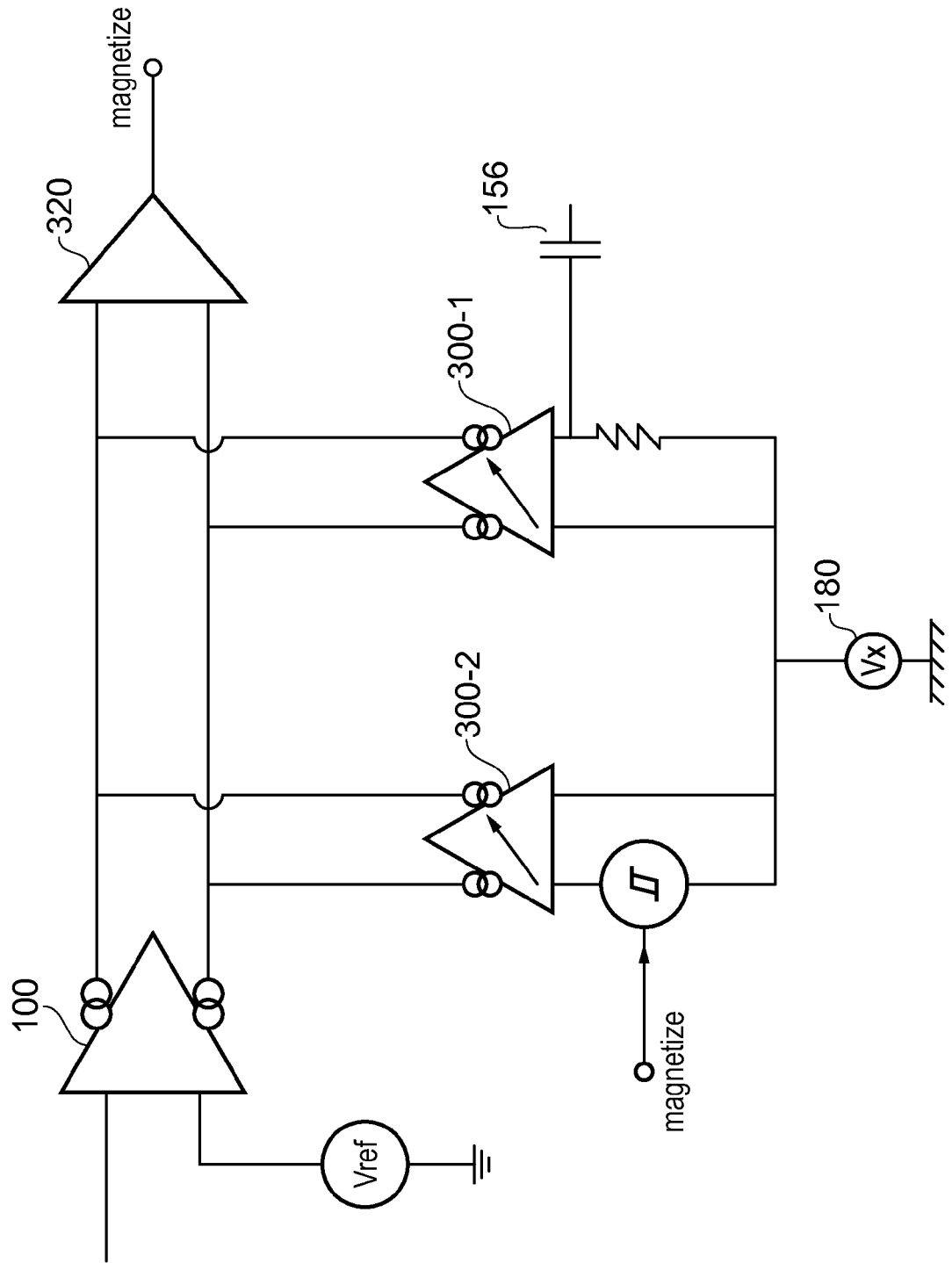
FIG. 10 shows a modification to the arrangement of FIG. 9.

The amplifier 300 of FIG. 9 could be replaced by two amplifiers 300-1 and 300-2 as shown in FIG. 10 allowing for independent control of a gain applied to the ripple voltage compared to that of the hysteresis signal. This ability to independently vary the relative gains allows a system designer, or an automated control system, to vary the response of the buck converter. In general terms, increasing the gain of the ripple voltage provides better stability, whereas decreasing it provides faster transient response.

The above described embodiments are provided by way of example only and are not intended to limit the scope of the invention as defined in the claims. Furthermore, the claims have been written in single dependency format for first filing at the United States Patent and Trademark Office. However for filings claiming priority from this filing it is to be assumed that, unless such a combination is clearly not feasible, each claim is dependent on any preceding claim which depends on a shared independent claim.

The invention claimed is:

1. A buck converter that produces an output voltage and that includes:
   an inductor;
   a controller arranged to monitor the output voltage;
   a switching arrangement responsive to the output of the controller for selectively connecting a first terminal of the inductor to a first voltage or to a second voltage; and
   a storage element connected to a second terminal of the inductor;
   wherein the controller comprises:
      a comparator arranged to compare a feedback signal representative of the output voltage with a reference voltage, and
      a modification circuit within the comparator or connected to a modification signal input of the comparator and arranged to produce a correction signal to modify the operation of the comparator;
      wherein the modification circuit receives a modification circuit input signal representing the first voltage or the second voltage selectively connected to the first terminal of the inductor;
      wherein the modification circuit includes an integrator coupled to receive a modification circuit input signal representing the voltage at the first terminal of the inductor, to integrate the modification circuit input signal and to produce an integrator output signal;
      wherein the modification circuit includes a voltage controlled current flow control device;
      wherein the integrator is coupled to supply at least a portion of the integrator output signal to control the voltage controlled current flow control device to produce the correction signal to modify the operation of the comparator; and
      wherein the modification circuit includes a DC block coupled between the integrator and the voltage controlled current flow device to block a DC component of the integrator output signal and to pass an AC component of the integrator output signal.

2. The buck converter as claimed in claim 1, in which the modification circuit further includes a scaling circuit for applying a scaling factor to the modification circuit input signal or to an output of the integrator.

3. The buck converter as claimed in claim 1, in which the modification circuit includes a ripple extraction circuit or component, so as to extract a time varying signal from a substantially invariant background.

4. The buck converter as claimed in claim 1, in which the comparator has a differential input stage, comprising first and second field effect transistors each exhibiting a first transconductance, and the modification circuit modifies a current flowing through at least one of the first and second transistors.

5. The buck converter as claimed in claim 1, further including a frequency controller arranged to modify a switching frequency of the switching arrangement.

6. The buck converter as claimed in claim 1, in which the comparator exhibits hysteresis.

7. The buck converter as claimed in claim 1, in which the modification circuit emulates the current flowing in the inductor.

8. The buck converter as claimed in claim 7, in which the modification circuit integrates an input signal so as to emulate the current flowing in the inductor.

9. The buck converter as claimed in claim 8, in which the modification circuit scales the emulated current or the integral thereof.

10. The buck converter as claimed in claim 9, in which the current flowing in the inductor is emulated by at least one of a current source and a current sink arranged to charge and discharge a capacitor.

11. A buck converter comprising a controller arranged to monitor an output voltage of the converter, the controller comprising:
   a comparator arranged to compare a feedback signal representative of an output voltage at an output of the buck converter with a reference voltage;
   a modification circuit within the comparator or connected to a modification signal input of the comparator and arranged to produce a correction signal to modify the operation of the comparator;
   an output;
   wherein the comparator includes a differential input stage, comprising first and second field effect transistors each exhibiting a first transconductance, and the modification circuit modifies a current flowing through at least one of the first and second transistors;
   a current source or current sink in series with a third field effect transistor having a transconductance, wherein the third field effect transistor has its gate arranged to receive an integrated version of the modification circuit input signal; and
   a node between the current source or current sink and the third field effect transistor is connected to a drain of one of the first and second field effect transistors.

12. A buck converter comprising a controller arranged to monitor an output voltage of the converter, the controller comprising:
  a comparator arranged to compare a feedback signal representative of the output voltage with a reference voltage, and
  a modification circuit within the comparator or connected to a modification signal input of the comparator and arranged to produce a correction signal to modify the operation of the comparator;
  an output;
  a frequency controller arranged to modify a switching frequency of the switching arrangement; and
  a frequency or phase comparator arranged to control current to be selectively added to or removed from a output of the comparator where the comparator outputs a current as a function of a voltage difference between the output voltage and the reference voltage.

13. The buck converter as claimed in claim 12 further comprising a controllable current flow device to deliver current to a summing node of the comparator.

14. The buck converter as claimed in claim 12, further comprising a controllable current flow device to remove current from a summing node of the comparator.

15. The buck converter as claimed in claim 12, in which the comparator comprises a differential pair, and a current control device is connected to each arm of the differential pair and enabled or disabled in accordance with a switching signal generated by the differential pair.

16. A buck converter that produces an output voltage and that includes:
  an inductor;
  a controller arranged to monitor an output voltage of the converter;
  a switching arrangement responsive to the output of the controller for selectively connecting a first terminal of the inductor to a first voltage or to a second voltage; and
  a storage element connected to a second terminal of the inductor;
  wherein the controller comprises:
  a comparator arranged to compare a feedback signal representative of an output voltage at an output of the buck converter with a reference voltage, and
  a modification circuit within the comparator or connected to a modification signal input of the comparator and arranged to produce a correction signal to modify the operation of the comparator;
  an output;
  a frequency controller arranged to modify a switching frequency of the switching arrangement;
  wherein the comparator has a differential input stage, comprising first and second field effect transistors each exhibiting a first transconductance, and the modification circuit modifies a current flowing through at least one of the first and second transistors;
  wherein the modification circuit comprises a differential transconductance amplifier having a first current output connected to a first summing node of the comparator differential input stage, and a second current output connected to a second summing node of the comparator differential input stage, and a first input of the differential transconductance amplifier receives an integrated version of the voltage supplied to the voltage at the first terminal of the inductor or an emulated version thereof, and the second input of the differential amplifier receives a hysteresis control signal.

17. The buck converter as claimed in claim 16, in which the signals supplied to the first and second inputs have a bias voltage superimposed thereon.

18. The buck converter as claimed in claim 16, in which a DC component of the integrated version of the voltage supplied to the first terminal of the inductor is removed.

19. The buck converter as claimed in claim 16, in which the hysteresis control signal is an alternating signal.

20. The buck converter as claimed in claim 16, in which the hysteresis signal control is a square wave.

21. The buck converter as claimed in claim 16, in which a magnitude of the hysteresis control signal is used to control a difference between switching thresholds in the controller.

22. The buck converter as claimed in claim 16, comprising a further comparator stage having a first input connected to the first summing node of the comparator differential input stage and a second input connected to the second summing node of the comparator differential input stage.

* * * * *